Patented July 12, 1938

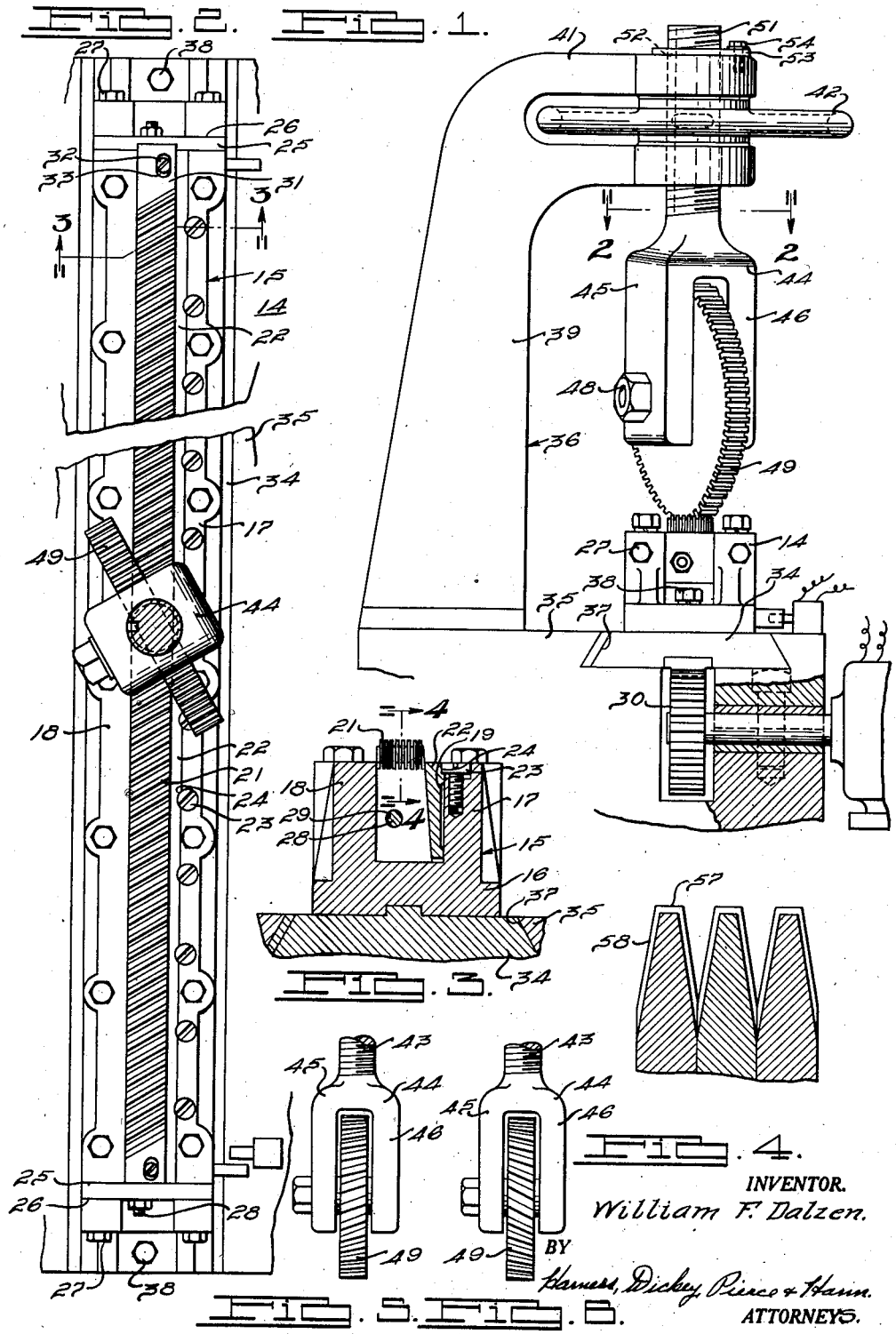

2,123,717

UNITED STATES PATENT OFFICE 2,123,717

GEAR FINISHING MACHINE

William F. Dalzen, Grosse Pointe, Mich., assignor to Michigan Tool Company, a corporation of Delaware Original application July 31, 1931, Serial No. 554,193. Divided and this application August 1, 1935, Serial No. 34,139

7 Claims. (Cl. 90—2)

This application is a division of application Serial No. 554,193, filed July 31, 1931, and relates to gears and particularly to the apparatus for cutting and finishing teeth on a gear blank through the rolling of the gear relative to the cutter during the time the teeth thereof are moved laterally relative to each other.

It has been the practice heretofore to cut teeth on gear blanks by a tooth generating operation wherein the cutter and the gear blank are rotated in timed relation. Expensive machines, which were extremely accurate, were employed for supporting the cutters and the blanks in an attempt to eliminate errors in the tooth profile and spacing. While the errors are reduced to a minimum, nevertheless, owing to the variation in the hardness of the material at different points about the gear blank and also because of slight machine errors which are impossible to eliminate, the spacing and the profile of the teeth are not entirely uniform when generated by the present known methods.

When my cutting tool is employed, a gear may be generated which is extremely accurate because of the accuracy with which my tool may be constructed and operated. The profile of the teeth of the cutting tool may be constructed to be exactly the same on both sides and the spacing is, in like manner, made to be exact, so that the gears which are finished by my cutting tool will accurately mesh therewith and with each other. The employment of my cutting tool eliminates any machine errors from effecting changes in the tooth contour or spacing, as the errors of the machine cannot be introduced between the cutter and gear blank. For this reason the expensive machine above referred to need no longer be employed for gear tooth generation and an extremely simple and inexpensive machine may be utilized for effecting the manipulation of my gear cutter.

When a formed cutter or grinding wheel is employed for generating teeth on gears, the teeth formed thereby are inaccurate because the cutters for grinding wheels are only approximate in contour below the base circle which is well known to be within the working depth of the gear teeth. My present cutter reaches to the full tooth depth and accurately machines a correct profile, regardless of the gear diameter, pitch or pressure angle, and regardless of whether or not the base circle is larger or smaller than the diameter of the gear at the bottom of the tooth gap. It will be further apparent that the teeth of a gear will remain in contact with a greater number of teeth on my cutting tool than will be in contact with a second gear generated in like manner by the tool, and interference between the teeth of the two gears will be impossible.

Accordingly, the present invention has for its main objects: to provide apparatus for machining teeth on a gear blank of accurate predetermined contour and spacing throughout the entire periphery of the gear; apparatus for machining teeth on gears which effects an arcuate lateral movement between the teeth when the cutter and gear are moved longitudinally when in meshed relation; the provision of a machine which supports a gear relative to a cutter in such manner as to effect a lateral movement both to the cutter and the gear blank as the blank is rotated relative to the cutter; and, in general, to provide apparatus for machining a gear which rapidly cuts the teeth to accurate dimensions through the arcuate lateral movement provided between the teeth of the cutter and those of the gear effected on a machine which is simple in construction and operation and which provides an exceptionally fine finish on the sides of the teeth which are of extremely accurate dimensions.

Other objects and features of novelty of my invention will be either specifically pointed out or will become apparent when referring, for a better understanding of my invention, to the following description in conjunction with the accompanying drawing, wherein:

Figure 1 is a view in elevation of a gear cutting machine embodying features of my invention, Fig. 2 is a broken sectional view of the structure illustrated in Fig. 1, taken on the line 2—2 thereof, Fig. 3 is a sectional view of the structure illustrated in Fig. 2, taken on the line 3—3 thereof, Fig. 4 is an enlarged sectional view of the structure illustrated in Fig. 3, taken on the line 4—4 thereof, Fig. 5 is a broken view of a portion of the structure illustrated in Fig. 1 showing a gear as cut by a modified form thereof, and Fig. 6 is a view similar to Fig. 5 showing a further modified form of gear cut by structure embodying my invention.

In my co-pending application, Serial No. 554,192, filed July 31, 1931 and assigned to the assignee of the present invention, I have illustrated a cutting tool which is made up from a plurality of blades upon the ends of which teeth are provided of predetermined contour, having cutting edges disposed on the sides of the teeth and in some instances across their top edges. The teeth are disposed in rows, which may be extended laterally or angularly across a channel shaped holder, in which the blades are retained in fixed predetermined relation to form the cutting tool. The disposition of the teeth in the holder is opposite to the disposition of the teeth on the gear blanks, that is to say, when laterally disposed teeth are provided on the gear, such as those on a spur gear, the teeth in the cutter are angularly disposed, while in the case of a spiral gear, the teeth of the cutter are laterally disposed.

Referring to Figs. 2, 3 and 4, the cutter includes a channel shaped body portion 15 having a base portion 16 and upstanding side portions 17 and 18 which form a central recess 19. A plurality of blades 21 are disposed in the recess 19 either laterally or angularly relative to the upstanding side portions 17 and 18, as pointed out above. A wedge member 22 engages sloping sides of the blades 21, as illustrated in Fig. 3, and is drawn downwardly in the recess by a plurality of screws 23, the heads of which engage recesses 24 provided in the wedge member. End plates 25 are disposed in slots 26, provided in the ends of the upstanding portions 17 and 18, for closing the ends of the recess 19 when supported in fixed relation to the holder 15 by bolts 27. A bolt 28 extends through aperture 29 provided through the blades, as illustrated in Fig. 3, for supporting the blades on the end plates 25. A wedge member 31, having a sloping surface in engagement with a sloping surface of one of the plates 25, forces the blades 21 into intimate longitudinal relation when a screw 32, disposed in an elongated aperture 33 in the wedge member, is tightened.

The cutter 14 is attached to a slidable plate 34 of truncated conical section, the sloping sides of which are retained in a dovetailed recess 37 provided in a base plate 35 of a machine 36. Suitable mechanism 30, including a reversing motor, a rack and pinion, is employed for reciprocating the slidable plate 34 and, therefore, the cutter 14, which is retained by bolts 38 in fixed relation to the plate. An arm 39 projects upwardly from the base plate 35 having a laterally extending portion 41 on its upper end, which is bifurcated to receive a hand wheel 42 through which a threaded end 43, of a gear blank supporting member 44, extends. The turning of the hand wheel 42 raises and lowers the member 44 relative to the cutter 14 for positioning the gear blanks relative to the teeth of the cutter. The lower end of the member 44 is bifurcated, having downwardly extending side portions 45 and 46 through which aligned apertures extend for receiving a spindle 48 for supporting a gear blank 49 in the space between the downwardly extending portions 45 and 46 for rotational movement on the spindle One side of the threaded end 43 of the member 44 is grooved at 51 in which an inwardly extending tenon 52 of a washer 53 registers, for the purpose of angularly positioning the member 44 relative to the cutter 14. A screw 54 extending through a slot in the washer 53 is tightened to draw the washer into fixed relation to the top surface of the extending portion 41 of the projecting member 39. I have illustrated in Figs. 1 and 2 a spur gear 49 supported by the member 44 with the laterally disposed teeth thereof in mesh with the teeth 21 of the tool 14. The teeth of the cutting tool 14 are disposed at an angle for the purpose of having the gear blank disposed angularly relative to the movement of the cutter for effecting a relative lateral movement between the teeth of the cutter and gear for machining the sides of the gear teeth when the cutter is moved longitudinally.

The hand wheel 42 is operated to force the gear blanks 49 into intimate contact with the teeth of the cutter 14, after which the cutter is reciprocated during the time additional pressure is applied to the gear blank through the further downward movement of the member 44 effected by the operation of the hand wheel 42. When the center of the spindle 48 has moved downwardly until it is disposed a predetermined distance above the cutting teeth, the gear is then machined to a predetermined diameter having teeth of accurate predetermined shape and dimensions.

As pointed out in my above mentioned copending application, the cutting of the teeth is effected by the cutting edges provided on the sides of the teeth of the tool. The cutting edges are formed by a plurality of grooves disposed vertically or angularly in the tooth sides when a finishing operation is to be effected on previously roughed out teeth of a gear blank. When the entire cutting operation is to be performed by my machine, that is to say, when the teeth are to be roughed and finished by my cutting tool, I provide additional grooves across the top edge of the teeth, as illustrated in Figs. 3 and 4, for effecting cutting edges 57 at the top of the teeth in addition to the cutting edges 58 provided on their sides. The angular disposition of the gear blank relative to the movement of the cutter effects a lateral movement between the engaging sides of the teeth during the rotation of the blank, through its longitudinal movement or that of the cutter, to machine the sides of the gear teeth as they pass across the cutting edges 57 and 58 of the cutter teeth.

In Figs. 5 and 6 I have illustrated right and left hand spiral gears, that is to say, gears having angularly disposed teeth which may slope in either direction as shown in the figures. When spiral gears of this type are to be cut by my cutting tool, I dispose the blades 21 laterally across the channel shaped member 15 and likewise angularly dispose the gear blank when supported by the member 44, to have the teeth of the blank register with the teeth of the cutting tool. The angular disposition between the gear blank and the cutter effects the lateral movement between the teeth of the cutter and the blank for accurately machining the sides of the teeth of the gear into predetermined tooth formation.

As pointed out in my foregoing application, when the cutting edges 57 are provided on the top of the cutting teeth, the gear blank may be mounted directly upon the member 44 without first roughing out teeth in the periphery thereof, the roughing operation being effected by the cutting edges 57 and 58 of the cutter. While a complete cutting operation for machining teeth in the gear blank may be effected by my cutting tool, it is to be understood that the tool operates more efficiently in finishing the teeth after they have first been roughed out by a hobbing or like cutting operation.

This method of roughing and finishing gears is capable of being extended through the employment of a circular cutter in place of the flat cutter herein described and illustrated. An arbor is provided for supporting and rotating the cutter which is substituted for the mechanism for longitudinally moving the cutting tool. The cutting tool, in the nature of a gear, may be built up from a plurality of blades having cutting sides as herein illustrated or a solid gear may be constructed as a cutting tool having the flanks of the teeth provided with lands and grooves for effecting the cutting edges employed for machining the sides of the gear teeth. In like manner the cutter having horizontally disposed teeth may be made from a single piece of material instead of from a plurality of blades as herein illustrated.

My cutting tool accurately machines teeth on a gear independent of the machine upon which it is supported and by which the relative movement between the gear and cutter is effected. The error heretofore introduced by the machine in the tooth shape and spacing during the generating operation is entirely eliminated and a comparatively simple, inexpensive machine may be employed for supporting and effecting the relative movement between my cutter and a gear blank.

Tools suitable for use in my machine are also described and claimed as such in my copending application, Serial No. 554,192, filed July 31, 1931; and the method of finishing gears according to my invention is claimed in my said copending application, Serial No. 554,193, filed July 31, 1931.

In the claims the expression "gear-like tool" is used to define a tool of the character of a spur or helical gear which will operate as a driving gear and also as a driven gear. This includes a rack, such as illustrated in the drawing, which is considered here as a circular gear of infinite radius, having a theoretical axis parallel to the pitch surface of the rack teeth about which the rack teeth may be said to rotate. The expression "gear-like tool" in the claims excludes a hob or similar wormlike cutting tool having a helix angle so large that it cannot be driven by the gear which it cuts. The plane of movement of the tool referred to in certain of the claims is the plane of rotation of a circular tool, or that plane of movement of a rack tool which is perpendicular to the theoretical axis of the rack and parallel to the path of movement followed by the rack during reciprocation.

Rotation of a pair of gears when in mesh on parallel axes will produce slippage between the meshed teeth in a radial or vertical direction, that is perpendicular to the pitch lines of the meshed teeth. If one of a pair of meshed gears is moved axially with respect to the other without rotation the slippage occurring between the meshed teeth will be lateral in direction, that is, parallel to the pitch lines of the meshed teeth. This latter is true irrespective of whether the gears are on parallel axes or not. When this radial and lateral slippage occur simultaneously, the resulting slippage between the meshed teeth is in a direction diagonally of the tooth faces and is the resultant of these two simultaneously acting components of movement. Such simultaneous lateral and radial slippage may be secured, as in the embodiment of the invention disclosed herein, by rotating the gear in mesh with the tool in a plane at an angle to the plane of movement of the tool, or, as stated in certain of the claims, with the axes of the tool and gear at an angle to each other. The rolling component of movement is therefore the component which tends to produce slippage between the teeth in a direction perpendicular to the pitch lines of the meshed teeth and the "lateral component of movement" is the component which tends to produce slippage in a direction parallel to the pitch lines of the meshed teeth. The reference to "lateral cutting edges" in the claims means cutting edges which cut due to the lateral component of movement. Such cutting edges, if they extend substantially vertically of the tool teeth, lie substantially parallel to the plane of roll of the gear and substantially parallel to the vertical or radial component of sliding movement. Accordingly, vertical or substantially vertical cutting edges are provided so that there will not be any material cutting resulting from that vertical or radial component of sliding movement.

The terminology substantially vertical cutting edges is intended to include cutting edges which may be somewhat inclined from the vertical but which are not of sufficient inclination to cause material cutting as a result of the vertical or radial component of sliding movement between the gear and tool teeth. Likewise the terminology "with the engaged cutting edges of the tool substantially parallel to the plane of rotation of the gear" is intended to include a similar variation from parallelism with the plane of rotation of the gear.

While I have specified that the cutter is actuated to effect the machining of the gears, it is to be understood that the same result may be obtained by actuating the gear and/or its support across the cutting tool. In either case a gear having extremely accurate tooth profile and spacing is finished, or roughed and finished, by an operation which utilizes my cutting method.

While I have described and illustrated several embodiments of my invention, it will be apparent to those skilled in the art that various changes, omissions, additions and substitutions may be made therein without departing from the spirit and scope of my invention, as set forth in the accompanying claims.

I claim:

1. In a machine for finishing roughed out gear teeth utilizing a tool having a plurality of teeth one flank of each of which is formed of a plurality of spaced lands having substantially parallel lateral cutting edges thereon, the combination of means for supporting said gear and said tool in engaging relation with the said lateral cutting edges in planes substantially parallel to the plane of the roll of the gear relative to the tool; and means for rolling said gear relative to said tool and for introducing a lateral component of movement between said gear and tool teeth.

2. In a machine for finishing roughed out teeth utilizing a tool having a plurality of teeth one flank of each of which is formed of a plurality of spaced lands having substantially parallel lateral cutting edges thereon, the combination of means for supporting said gear and said tool in engaging relation with the axes thereof at an angle to each other and with the said lateral cutting edges in planes substantially parallel to the plane of the roll of the gear relative to the tool; and means for rolling said gear relative to said tool thereby introducing a lateral component of movement between said gear and tool teeth.

3. In a machine for finishing roughed out gear teeth utilizing a tool having a plurality of teeth one flank of each of which is formed of a plurality of spaced lands having substantially parallel lateral cutting edges thereon, the combination of means for supporting said gear and said tool in engaging relation with the said lateral cutting edges in planes substantially parallel to the plane of the roll of the gear relative to the tool; and means for rolling said gear relative to said tool and for introducing a lateral component of movement between said gear and tool teeth; and additional means for feeding said gear radially relative to said tool.

4. In a machine for finishing roughed out teeth utilizing a tool having a plurality of teeth one flank of each of which is formed of a plurality of spaced lands having substantially parallel lateral cutting edges thereon, the combination of means for supporting said gear and said tool in engaging relation with the axes thereof at an angle to each other and with the said lateral cutting edges in planes substantially parallel to the plane of the roll of the gear relative to the tool; and means for rolling said gear relative to said tool thereby introducing a lateral component of movement between said gear and tool teeth; and additional means for feeding said gear radially relative to said tool.

5. A machine for finish cutting roughed out gears, comprising, in combination, a gear-like tool having a plurality of teeth conjugate to the teeth to be produced on the gear to be finished, the working surfaces of each of the teeth of said tool being provided with a plurality of narrow parallel grooves separated by narrow lands, the edges of said lands forming parallel cutting edges, said grooves and cutting edges extending substantially vertically from the roots of the teeth to the crests thereof, means for operatively supporting the tool and gear in mesh with the engaged cutting edges of the tool substantially parallel to the plane of rotation of the gear, means for driving one by the other to bring the cutting edges progressively into contact with the gear teeth, and means for introducing a simultaneous lateral component of movement between the meshed teeth of the gear and tool in a direction transverse to the cutting edges in contact with the gear to effect cutting of the gear teeth by said vertical cutting edges.

6. A machine for finish cutting roughed out gears, comprising, in combination, a gear-like tool having a plurality of teeth conjugate to the teeth to be produced on the gear to be finished, the working surfaces of each of the teeth of said tool being provided with a plurality of narrow parallel grooves separated by narrow lands, the edges of said lands forming parallel cutting edges, said grooves and cutting edges extending substantially vertically from the roots of the teeth to the crests thereof, means for operatively supporting the tool and gear in mesh with the engaged cutting edges of the tool substantially parallel to the plane of rotation of the gear, means for driving one by the other to bring the cutting edges progressively into contact with the gear teeth, means for introducing a simultaneous lateral component of movement between the meshed teeth of the gear and tool in a direction transverse to the cutting edges in contact with the gear to effect cutting of the gear teeth by said vertical cutting edges, and means for feeding the gear and tool relatively toward each other radially of the gear to force the cutting edges on oppositely directed faces of the tool teeth simultaneously into engagement with oppositely directed faces on the gear teeth.

7. A machine for finish cutting roughed out gears, comprising, in combination, a gear-like tool having a plurality of teeth conjugate to the teeth to be produced on the gear to be finished, the working surfaces of each of the teeth of said tool being provided with a plurality of narrow parallel grooves separated by narrow lands, the edges of said lands forming parallel cutting edges, said grooves and cutting edges extending substantially vertically from the roots of the teeth to the crests thereof, means for operatively supporting the tool and gear in mesh with their planes of movement at an angle to each other and with the engaged cutting edges of the tool substantially parallel to the plane of rotation of the gear, means for driving one by the other to bring the cutting edges progressively into contact with the gear teeth and to cause a simultaneous lateral component of movement between the meshed teeth of the gear and tool in a direction transverse to the cutting edges in contact with the gear to effect cutting of the gear teeth by said vertical cutting edges, and means for feeding the gear and tool relatively toward each other radially of the gear to force the cutting edges on oppositely directed faces of the tool teeth simultaneously into engagement with oppositely directed faces on the gear teeth.

WILLIAM F. DALZEN.